United States Patent [19]

Shah et al.

[11] Patent Number: 5,232,996
[45] Date of Patent: Aug. 3, 1993

[54] ACRYLATE-TERMINATED POLYURETHANE/EPOXY ADHESIVES

[75] Inventors: Dilip N. Shah, Wescosville; Terrance H. Dawdy, Erie, both of Pa.

[73] Assignee: Lord Corporation, Erie, Pa.

[21] Appl. No.: 879,826

[22] Filed: May 7, 1992

[51] Int. Cl.$^5$ ............................................. C08G 18/04
[52] U.S. Cl. ................................... 525/452; 525/528; 525/529; 525/920; 528/123
[58] Field of Search ............... 525/452, 920, 528, 529; 528/123

[56] References Cited

U.S. PATENT DOCUMENTS

| | | | |
|---|---|---|---|
| 3,660,145 | 5/1972 | Johnson et al. | 525/920 |
| 4,268,646 | 5/1981 | Agger et al. | 525/920 |
| 4,446,286 | 5/1984 | Kolycheck et al. | 525/920 |
| 4,524,181 | 6/1985 | Adam et al. | 525/107 |
| 4,578,424 | 3/1986 | Goel | 525/109 |
| 4,719,268 | 1/1988 | Hefner, Jr. et al. | 525/920 |
| 4,740,539 | 4/1988 | Goel | 523/400 |
| 4,742,147 | 5/1988 | Nichols | 528/75 |
| 4,803,232 | 2/1989 | Shah | 523/456 |
| 4,829,123 | 5/1989 | Shigematsu et al. | 525/920 |
| 4,921,912 | 5/1990 | Sagawa et al. | 525/112 |
| 5,019,608 | 5/1991 | Shah | 523/456 |
| 5,093,386 | 3/1992 | Bishop et al. | 522/97 |

OTHER PUBLICATIONS

"Handbook of Epoxy Resins" by Lee & Neville, McGraw Hill, 1967, pp. (7-3, 10-5 to 10-10, 14-2 to 14-7, and 10-2).

Primary Examiner—John C. Bleutge
Assistant Examiner—Randy Gulakowski
Attorney, Agent, or Firm—W. Graham Buie

[57] ABSTRACT

A two-part adhesive composition useful for bonding various materials including plastic or thermoplastic substrates. The first part of the adhesive contains an epoxy compound and an acrylate-terminated polyurethane while the second part of the adhesive contains an amine hardener. The presence of the acrylate-terminated polyurethane allows the adhesive composition to be applied to unprepared substrates to form a bond having high strength.

22 Claims, No Drawings

ACRYLATE-TERMINATED POLYURETHANE/EPOXY ADHESIVES

FIELD OF THE INVENTION

The present invention relates to structural adhesive compositions useful for bonding various substrates. More particularly, the present invention relates to two-part epoxy adhesive compositions which contain an acrylate-terminated polyurethane and which can be utilized to form high-strength, flexible bonds with a variety of unprepared substrates.

BACKGROUND OF THE INVENTION

The utilization of plastic and thermoplastic substrates in various industries typically requires the use of curable adhesive compositions to affix or bond the substrate to another structural component. The bond formed between the plastic or thermoplastic substrate and the structural component must meet certain requirements of adhesive strength depending on the particular application. One example of an industrial utilization of plastic substrates involves the use of rigid fiber-reinforced plastic composite materials in the form of sheet molding compound (SMC) in the automobile industry as an alternative to steel automotive body panels in an effort to reduce weight and corrosion susceptibility of an automobile, van, truck or the like. Sheet molding compound is typically comprised of various resin compositions such as a polyester resin reinforced with, for example, glass fibers. The sheet molding compound is molded under heat and pressure in order to prepare a rigid, self-supporting, fiber-reinforced structure.

One example of an adhesive composition which has previously been described as being useful for bonding sheet molding compounds and other substrates is disclosed in U.S. Pat. No. 4,578,424. The adhesive is a two-component adhesive wherein the first component of the adhesive contains an epoxy resin and an additive selected from the group consisting of a polyisocyanate, a carboxylic anhydride, and molecules with unsaturated carbon-carbon bonds capable of undergoing Michael addition reaction with amines. The second component of the adhesive is a hardener component for curing the first component and contains a mixture of amido amines, primary and secondary amines having tertiary amine groups or ether groups in their backbone, and bis-phenol A. Maleic or fumeric groups are given as examples of molecules with unsaturated carbon-carbon bonds capable of undergoing Michael addition reaction with amines.

Another adhesive composition previously described in the patent literature as being useful for bonding sheet molding compounds and other substrates is described in U.S. Pat. No. 4,803,232. This adhesive composition is a two-component system wherein the first component contains an epoxy resin and an acrylate or methacrylate ester of an aliphatic polyhydric alcohol. The second component of the adhesive composition contains an amine-terminal butadiene-acrylonitrile rubber, at least one aliphatic or aromatic polyamine, and at least one polyamido-amine.

Previously developed structural adhesive compositions such as those described above are more effective when the surface of the substrate to be bonded is specially prepared prior to application and curing of the adhesive. Typical surface preparation techniques involve solvent wiping, abrading or priming, all of which can be cumbersome, expensive and time-consuming. Another disadvantage associated with many traditional structural adhesive compositions is that they often require the addition of a rubber component, such as a carboxylic acid group- or amine group-terminated butadiene/acrylonitrile copolymer rubber, to the epoxy resin in order to impart needed flexibility to the resulting bond. Furthermore, many structural adhesives lack versatility in that they can only be utilized to bond a specific type of substrate.

A need therefore exists for a structural adhesive composition that can be applied to a variety of unprepared substrates so as to produce a flexible adhesive bond without the need for an additional rubber component. It would also be desirable for such an adhesive composition to cure at a reasonably rapid rate and to produce a bond which exhibits a high degree of strength.

SUMMARY OF THE INVENTION

The present invention is a structural adhesive composition that can be bonded to unprepared substrates so as to form, at a high cure rate, a flexible adhesive bond that exhibits high strength. The present invention is based on the discovery that the utilization of certain acrylate-terminated polyurethanes in a two-part adhesive composition results in enhanced bonding activity which allows the adhesive composition to be applied to unprepared substrates. Specifically, the present invention relates to a two-part adhesive composition comprising a Component A and a Component B, wherein Component A comprises an epoxy compound and an acrylate-terminated polyurethane and Component B comprises an amine hardener.

DETAILED DESCRIPTION OF THE INVENTION

Component A of the present invention comprises an epoxy compound and an acrylate-terminated polyurethane. The epoxy compound of the invention can be any monomeric or polymeric compound or mixtures of compounds having an epoxy equivalency greater than one, that is, wherein the average number of epoxy groups per molecule is greater than one, with monomeric epoxides having two epoxy groups being currently preferred. Epoxy compounds are well known and are described in, for example, U.S. Pat. Nos. 2,467,171; 2,615,007; 2,716,123; 3,030,336; and 3,053,855 which are incorporated herein by reference. Useful epoxy compounds include the polyglycidyl ethers of polyhydric polyols, such as ethylene glycol, triethylene glycol, 1,2-propylene glycol, 1,5-pentanediol, 1,2,6-hexanetriol, glycerol and 2,2-bis(4-hydroxy cyclohexyl) propane; the polyglycidyl esters of aliphatic or aromatic polycarboxylic acids, such as oxalic acid, succinic acid, glutaric acid, terephthalic acid, 2,6-naphthalene dicarboxylic acid and dimerized linoleic acid; the polyglycidyl ethers of polyphenols, such as 2,2-bis(4-hydroxyphenyl) propane (commonly known as bis-phenol A), 1,1-bis(4-hydroxyphenyl) ethane, 1,1-bis(4-hydroxyphenyl) isobutane, 4,4'-dihydroxybenzophenone, 2,2-bis(4-hydroxyphenyl) butane, bis(2-dihydroxynaphthyl) methane, phloroglucinol, bis(4-hydroxyphenyl) sulfone, 1,5-dihydroxynaphthalene, and novolak resins; with the polyglycidyl ethers of polyphenols being currently preferred. Generally the preferred epoxy compounds are resins having an epoxide equivalent weight of about 100 to 2000, preferably about 110 to 500. The presently preferred epoxy compound is a polyglycidyl ether of a polyphenol, such as the polyglycidyl ether of bis-phenol A supplied by Shell Chemical Company under the trade name EPON 828. The epoxy compound is utilized in an amount ranging from about 5 to 80, preferably from about 20 to 60, percent by weight of the essential components of Component A. The essential components of Component A herein refer to the epoxy compound and the acrylate-terminated polyurethane.

The acrylate-terminated polyurethanes of the present invention comprise the reaction product of at least one polyisocyanate, at least one monomeric or polymeric organic compound characterized by the presence of at least two isocyanate-reactive active hydrogen, and at least one acrylate compound. While the acrylate-terminated polyurethanes of the present invention can be prepared by any one of several known reaction routes, the polyurethanes of the present invention are typically prepared by reacting an excess of a polyisocyanate with an acrylate compound to form an NCO-functional acrylate/isocyanate prepolymer which is then reacted with an active hydrogen-containing material to form the final acrylate-terminated polyurethane.

The polyisocyanates which can be employed in forming the acrylate-terminated polyurethanes in accordance with the present invention can be any organic isocyanate compound having at least two isocyanate groups, including mixtures of such compounds. Included within the purview of suitable polyisocyanates are aliphatic, cycloaliphatic, and aromatic polyisocyanates, as these terms are generally interpreted in the art. Thus it will be appreciated that any of the known polyisocyanates such as alkyl and alkylene polyisocyanates, cycloalkyl and cycloalkylene polyisocyanates, aryl and arylene polyisocyanates, and combinations such as alkylene, cycloalkylene and alkylene arylene polyisocyanates, can be employed in the practice of the present invention.

Suitable polyisocyanates for purposes of the present invention include, without limitation, toluene-2,4-diisocyanate, 4,4'-methylene-bis(cyclohexyl isocyanate), polymethylene polyphenylene isocyanate, 2,2,4-trimethylhexamethylene-1,6-diisocyanate, hexamethylene-1,6-diisocyanate, diphenylmethane-4,4'-diisocyanate, triphenyl-methane-4,4',4''-triisocyanate, m-phenylene diisocyanate, p-phenylene diisocyanate, 2,6-toluene diisocyanate, 1,5-naphthalene diisocyanate, naphthalene-1,4-diisocyanate, diphenylene-4,4'-diisocyanate, 3,3'-bi-toluene-4,4'-diisocyanate, 1,4-cyclohexylene dimethylene diisocyanate, xylene-1,4-diisocyanate, xylene-1,3-diisocyanate, cyclohexyl-1,4-diisocyanate, 3,3'-dimethyldiphenylmethane-4,4'-diisocyanate, isophorone diisocyanate, m-tetramethyl xylene diisocyanate, the product obtained by reacting trimethylol propane and 2,4-toluene diisocyanate in a molar ratio of 1:3, and the like. It is presently preferred to use toluene-2,4-diisocyanate, 4,4'-methylene-bis(cyclohexyl isocyanate), or polymethylene polyphenylene isocyanate as the polyisocyanate of the invention. The polyisocyanate is utilized in an amount ranging from about 15 to 40, preferably from about 20 to 30, percent by weight of the total ingredients utilized to prepare the acrylate-terminated polyurethane.

The active hydrogen-containing materials can be essentially any of the known polymeric materials having two or more isocyanate-reactive active hydrogen groups selected from hydroxyl, primary amine, secondary amine and mixtures of such groups. The active hydrogen groups are preferably hydroxyl or secondary amine groups. Suitable active hydrogen-containing polymeric compounds include polyether polyols such as polyethylene glycol, polypropylene glycol and polytetramethylene glycol; hydroxy-terminated polyalkylene esters of aliphatic, cycloaliphatic and aromatic diacids; esters of polyhydric alcohols and hydroxylated fatty acid resins; hydroxyl-terminated polybutadiene resins; hydroxylated acrylic and substituted acrylic resins, hydroxyl-terminated vinyl resins, and polycaprolactones. Generally, polymeric materials having two active hydrogen groups are preferred.

Polyester polyols are useful as the active hydrogen-containing materials of the present invention. Typical polyester polyols useful in the invention include those formed by the reaction of lactones or carboxylic acids with multi-functional hydroxy compounds. The carboxylic acid-based polyester polyols of the invention can be prepared according to methods known in the art by reacting carboxylic acids such as succinic acid, adipic acid, suberic acid, azelaic acid, sebacic acid, phthalic acid, isophthalic acid or terephthalic acid with multi-functional hydroxy compounds such as ethylene glycol, diethylene glycol, 1,4-butane diol, 1,3-propane diol, 1,6-hexane diol, trimethylol propane, glycerol, erythritol, pentaerythritol, poly(ethylene oxide) diol, poly(ethylene oxide/propylene oxide) diol and poly(tetramethylene oxide) diol in various combinations well known in the art. Presently preferred carboxylic acid-based polyester polyols include 1,6-hexane diol-isophthalate diol, 1,6-hexane dioladipate diol, 1,6-hexane diol-ethylene glycol-adipate diol, and mixtures thereof.

The present lactone-based polyester polyols are prepared according to methods known in the art by reacting a lactone such as caprolactone with a multi-functional hydroxy compound as defined immediately above. A particularly preferred lactone-based polyester polyol is a polycaprolactone triol prepared from the reaction of caprolactone and trimethylol propane. The molecular weight of the polyester polyol is typically in the range from about 250 to 3000, preferably from about 350 to 1000.

Presently most preferred for use in the present invention are poly(alkylene oxide) polyols. The poly(alkylene oxide) polyols are normally obtained from the polymerization, including block copolymerization, of cyclic ethers such as alkylene oxides, dioxolane and tetrahydrofuran, the condensation of glycols, or the condensation of cyclic ethers with glycols. They are well-known articles of commerce, and are also called polyalkylene ether glycols, polyalkylene glycols, polyalkylene oxide glycols, polyglycols and polyoxyalkylene glycols. They may be represented by the formula HO(RO)$_n$H, in which R is an alkylene radical and n is at least 2. The alkylene radical can be a single chain or can consist of two or more alkylene chains separated from each other by an ether oxygen atom. Preferred poly(alkylene oxide) polyols have from 1 to 9, preferably 1 to 6, carbon atoms in the alkylene chain separating each pair of oxygen atoms and have a number average molecular weight in the range of from about 100 to about 4,000, preferably about 100 to about 2,500. Not all the alkylene units need be the same. Poly(alkylene oxide) polyols formed by the copolymerization or condensation of mixtures of different cyclic ethers, glycols, or glycols and cyclic ethers can be used; as can poly(alkylene oxide) polyols derived from cyclic ethers such as dioxolane, which affords a polyol having the formula HO(CH$_2$OCH$_2$CH$_2$O)$_n$H, where n is greater than 1. The alkylene unit can be a straight or a branched chain, as in poly(propylene oxide) polyol. In the case where the alkylene unit is ethylene, it can be advantageous to incorporate the unit into a copolymer, for example, as a copolymer of ethylene oxide and propylene oxide, with up to 80 percent of such copolymer comprising ethylene oxide. The number of hydroxyl groups of the poly(alkylene oxide) polyols depends on the functionality of the glycol utilized to prepare the polyol. For example, difunctional and trifunctional glycols result in poly(alkylene oxide) diols and triols, respectively, and so forth for glycols with higher functionality. Thus, the poly(alkylene oxide) polyols will generally have from 2 to 6 hydroxyl groups, with such polyols having 2 hydroxyl groups being currently preferred.

Representative poly(alkylene oxide) polyols for use in the present invention include poly(ethylene oxide) polyols, poly(propylene oxide) polyols, poly(tetramethylene oxide) polyols, poly(nonamethylene oxide) polyols, poly(oxymethylene-ethylene oxide) polyols, poly(ethylene oxide-propylene oxide copolymer) polyols, and poly(pentaerythritol-ethylene oxide) polyols. Preferred poly(alkylene oxide) polyols are poly(propylene oxide) polyols, poly(tetramethylene oxide) polyols, poly(ethylene oxide-propylene oxide) polyols, and poly(ethylene oxide) polyols, with poly(propylene oxide) diol and poly(tetramethylene oxide) diol being most preferred.

Mixtures of active hydrogen-containing materials such as a combination of polyester polyols and poly(alkylene oxide) polyols may also be employed in the present invention. A preferred combination comprises poly(propylene oxide) diol, and 1,6-hexane diol/isophthalate-diol-type polyester polyols in a ratio of former to latter ranging from about 1:3 to 1:4. The active hydrogen-containing material or mixture thereof is utilized in an amount ranging from about 10 to 90, preferably from about 20 or 70, percent by weight of the total ingredients utilized to prepare the acrylate-terminated polyurethane.

The acrylate compounds utilized to prepare the acrylate-terminated polyurethanes of the present invention can be essentially any organic compound containing an acrylate moiety and containing a single isocyanate-reactive active hydrogen-containing group such as hydroxyl, primary amine or secondary amine. Typical acrylate compounds useful in the present invention include, without limitation, 2-hydroxyethyl acrylate, 2-hydroxypropyl acrylate, 3-hydroxypropyl acrylate, 4-hydroxybutyl acrylate, 8-hydroxyoctyl acrylate, 12-hydroxydodecanyl acrylate, 6-hydroxyhexyl oleate, diethylene glycol monoacrylate, hydroxy neopentyl acrylate, hydroxyneopentyl linoleate, hydroxyethyl-3-cinnamyloyloxypropyl acrylate, hydroxyethyl vinyl ether, allyl alcohol, mixtures thereof and the like. Acrylate-lactone adducts may also be utilized as the acrylate compound of the invention. An example of an acrylate-lactone adduct preferred for use in the invention is a 2-hydroxyethyl acrylate-caprolactone adduct such as TONE M-100 supplied by Union Carbide Corporation. It is presently preferred to utilize 2-hydroxyethyl acrylate, 2-hydroxypropyl acrylate, or a mixture of 2-hydroxyethyl acrylate and a 2-hydroxyethyl acrylate-caprolactone adduct as the acrylate compound of the invention. The acrylate compound or mixture of compounds is typically utilized in an amount ranging from about 5 to 70, preferably from about 10 to 50, percent by weight of the total ingredients utilized to prepare the acrylate-terminated polyurethane.

As indicated above, it is preferred to prepare the present acrylate-terminated polyurethanes by forming an isocyanate/acrylate prepolymer which is then reacted with an active hydrogen-containing compound such as a polyol to form the final polyurethane. Both of these reactions are typically carried out at temperatures ranging from about 50° C. to 90° C. In forming the acrylate-terminated polyurethanes according to this invention, the polyisocyanate compounds are employed in an amount sufficient to afford an NCO:OH ratio, with respect to the amount of active hydrogen-containing material in excess of 2:1, and preferably in the range of 2.5-5:1. The amount of acrylate compound characterized by the presence of a single isocyanate-reactive active hydrogen group will be sufficient to react with at least one unreacted isocyanate group, and is preferably an amount sufficient to afford an active hydrogen group:NCO ratio, with respect to the amount of excess polyisocyanate, of at least 1:1, with a slight excess of active hydrogen being presently preferred.

The acrylate-terminated polyurethane is utilized in an amount ranging from about 5 to 95, preferably from about 40 to 80, percent by weight of the essential components of Component A.

Component B of the present invention is an amine hardener which acts as a curing agent for the adhesive of the present invention. Component B can essentially be any amine or amide compound, or combination of such compounds including polyamidoamines, aliphatic polyamines, alicyclic polyamines, aromatic polyamines, and tertiary amines. Of the amine compounds useful in the present invention, aliphatic polyamines are preferred and contain at least two, preferably two to five, primary or secondary amine groups. Examples of such amines are polyalkylene polyamines, e.g. diethylene triamine, triethylene tetramine, tetraethylene pentamine, pentaethylene hexamine, ethylene diamine, tetramethyl diamine, hexamethylene diamine, polyether diamine, bis-hexamethylene triamine, diethylamino-propylene triamine, trimethylhexamethylene diamine, oleylamine, di-propylene triamine, 1,3,6-tris-aminomethyl-hexane, 3,9-bis(3-aminopropyl)-2,4,8,10-tetraoxaspiro-(5,5)-undecane, 1,3-bis-aminomethyl-cyclohexane, bis(4-aminocyclohexyl)methane, bis(4-amino-3-methylcyclohexyl)-methane, isophorone diamine, N-aminoethyl-piperazine, menthene diamine, diaminophenylmethane, anilineformaldehyde low molecular weight condensate, m-phenylene diamine, diaminodiphenyl-sulfone, dimethylaminomethylphenol, tris(dimethyl)aminoethyl-phenol and the like, with diethylene triamine, triethylene teramine and tetraethylene pentamine being presently preferred. Aromatic polyamines wherein the amine groups are directly attached to the aromatic ring, such as xylene diamine and the like, can also be used in the practice of the invention but are less preferred to their aliphatic counterparts.

The amide compounds which can be used in the amine hardener of the present invention are preferably polyamide or polyamidoamine compounds prepared by reacting aliphatic amines with dimerized fatty acids of 12 to 28 carbon atoms or other dicarboxylic acids as is known in the art. The polyamide and polyamidoamine compounds useful in the present invention are well known and commercially available. For example, a polyamide of dimerized linoleic acid preferred for use in the present invention is supplied by Henkel USA under the trade name VERSAMID 140.

Component B of the present invention preferably comprises a mixture of an aliphatic primary polyamine and a polyamide in a ratio of amine functionality to amide functionality ranging from about 1:3 to 1:5. Specifically, it is presently preferred to utilize triethylene tetramine in combination with a polyamide such as VERSAMID 140.

When it is desired to enhance the non-sag characteristics of the adhesive compositions of the invention the compositions may optionally include a mixture of a polyol and activated silica such as fumed silica or colloidal silica. The activated silica is believed to combine with the polyol via hydrogen-bonding to provide the thixotropic properties necessary to enhance non-sag characteristics of the adhesive composition.

The polyols that may be included in combination with the activated silica can be any of the poly(alkylene oxide) polyols described above with respect to the active hydrogen-containing materials utilized in preparing the present acrylate-terminated polyurethanes. The poly(alkylene oxide) polyols will generally have from 2 to 6 hydroxyl groups, with polyols having 2 hydroxyl groups being currently preferred. Particularly preferred are poly(ethylene oxide) diols such as diethylene glycol.

When employed, the mixture of activated silica and polyol generally form part of Component A. The polyol and the activated silica are usually added in respective amounts of about 1.0 to 5.0 parts per 100 parts by weight of Component A.

Although optional, it is preferred to include along with the amine hardener a hydroxy, ring-substituted, aromatic hydrocarbon such as phenol, polyphenol or the like so as to increase the cure rate of the epoxy adhesive as is known in the art. When employed, the hydroxy-substituted aromatic compound is utilized in an amount ranging from about 5 to 25, preferably from about 8 to 15, parts by weight per 100 parts by weight of Component B.

The adhesive compositions of the invention can also contain conventional additives normally found in epoxy adhesives, such as talc, metal powders, titanium dioxide, wetting agents, and the like. Such additives are incorporated in current ratios well known to practitioners in the art of epoxy adhesives.

In production, the adhesives are provided as two-part compositions, i.e., a Component A and a Component B. The parts are metered and mixed together immediately before use in a weight ratio of Component A:Component B ranging from about 0.5:1 to 10:1, preferably from about 0.8:1 to 2:1. After mixing, the adhesive is sufficiently viscous to form a discrete bead when extruded onto a surface and has a pot life of at least 30 minutes at ambient temperature. The adhesives are curable at ambient temperatures but are preferably cured at temperatures in the range from about 70° C. to 190° C. at which temperature cure is effected within a time period ranging from about 1 minute to 1 hour, typically from about 5 minutes to 40 minutes, depending on temperature.

Although capable of bonding any substrate or surface capable of receiving an adhesive, the adhesives of this invention are especially suited to bonding fiber reinforced unsaturated resin sheet molding compound (SMC) parts to other SMC parts or metals. The present adhesive compositions also exhibit an affinity for a surprisingly large variety of thermoplastic substrates such as acrylonitrile-butadiene-styrene, polybutylene terephthalate-modified polycarbonate, polycarbonate, and polyphenylene oxide. A bead of adhesive is applied to at least one of the surfaces which are to be bonded, the parts are mated together and the assembly is heated at a temperature in the range from about 70° C. to 190° C. for about 1 minute to 1 hour, preferably from about 5 to 40 minutes. At times, a post-bake at temperatures in the range from about 100° C. to 205° C. for about 5 to 30 minutes can be beneficial in enhancing properties such as heat and environmental resistance. While the adhesives can be applied by any conventional method such as by roll coater, brush, curtain coater, extrusion or hand roller, robotic dispensing machines are preferred.

The following examples are provided for purposes of specifically illustrating the invention and are not intended to limit in any manner the scope of the present invention.

Preparation of Acrylate-Terminated Polyurethanes

In Examples 1-3 below, three acrylate-terminated polyurethanes are prepared. The polyurethanes prepared are designated acrylated polyurethanes A, B, and C, corresponding to Examples 1, 2, and 3, respectively.

EXAMPLE 1

To a 5000 ml reaction flask fitted with a nitrogen purge is added 800 g of 4,4'-methylene-bis(cyclohexyl isocyanate) [DESMODUR W-Mobay Corporation] and 1376 g of a mixture of 2-hydroxyethyl acrylate (30%) and an adduct of 2-hydroxyethyl acrylate and caprolactone (70%) [TONE M-100 - Union Carbide Corporation], and the resulting mixture is allowed to react for three hours at 74° C., during which the NCO value drops to 3.99. To the reacted mixture is then added 998 g of poly(tetramethylene oxide) diol (MW 1000). The temperature is maintained at 80° C. for an additional four hours to achieve a final NCO value of 0.27.

EXAMPLE 2

To a 5000 ml reaction flask fitted with a nitrogen purge is added 724 g of 4,4'-methylene-bis(cyclohexyl isocyanate) [DESMODUR W-Mobay Corporation] and 1247 g of a mixture of 2-hydroxyethyl acrylate (30%) and an adduct of 2-hydroxyethyl acrylate and caprolactone (70%) [TONE M-100 - Union Carbide Corporation], and the resulting mixture is allowed to react at 77° C. for four hours until the NCO value drops to 4.0. To the reacted mixture is then added 128 g of poly(propylene oxide) diol (MW 385), followed by 527 g of a mixture of RUCOFLEX polyester polyols (1,6-hexane diol/isophthalate-type polyester polyols) (RUCO Corporation). This mixture of polyester polyols is identified as IC-4724-12. The temperature is maintained at 77° C. for an additional six hours to achieve a final NCO value of 0.01.

EXAMPLE 3

To a 2000 ml reaction flask fitted with a nitrogen purge is added 174 g of toluene-2,4-diisocyanate and 110 g of 2-hydroxyethyl acrylate and the resulting mixture is allowed to react at 60° C. for one hour, until the NCO value drops to 16.1. To the reacted mixture is then added 501 g of poly(propylene oxide) diol (MW 501). The reaction temperature is maintained at 65° C. for 90 minutes after which the final NCO value is determined to be 0.16.

EXAMPLES 4-7 energy to break is also given below and describes the pounds of force required to separate the SMC parts.

TABLE 1

| Example 4 | | Example 5 | | Example 6 | |
|---|---|---|---|---|---|
| Energy to Break (lbs.) | Mode of Failure | Energy to Break (lbs.) | Mode of Failure | Energy to Break (lbs.) | Mode of Failure |
| 115.52 | 90 FT/10 COH | 149.28 | 100 FT | 184.86 | 100 FT |
| 162.09 | 50 FT/50 COH | 157.74 | 100 FT | 156.53 | 100 FT |
| 161.77 | 80 FT/20 COH | 146.24 | 100 FT | 141.36 | 100 FT |
| 168.68 | 80 FT/20 COH | 173.75 | 100 FT | 188.29 | 100 FT |
| 168.06 | 100 FT | 119.31 | 100 FT | 182.26 | 100 FT |
| Avg. 155.22 | | Avg. 149.27 | | Avg. 170.86 | |

Urethanes A, B, and C prepared as above are utilized to prepare two-part adhesive compositions along with other ingredients in the gram amounts shown below:

| | Component A | | | |
|---|---|---|---|---|
| Ingredient | Example 4 | Example 5 | Example 6 | Example 7 |
| Acrylated Polyurethane A | 40.00 | 0.00 | 0.00 | 0.00 |
| Acrylated Polyurethane B | 0.00 | 40.00 | 0.00 | 0.00 |
| Acrylated Polyurethane C | 0.00 | 0.00 | 40.00 | 30.00 |
| Diglycidyl Ether of bis-phenol A[a] | 20.00 | 20.00 | 20.00 | 30.00 |
| Diethylene Glycol | 1.39 | 1.39 | 1.39 | 1.39 |
| Colloidal Silica | 2.71 | 2.71 | 2.71 | 2.71 |
| Titanium Dioxide | 0.70 | 0.70 | 0.70 | 0.70 |
| Talc | 35.20 | 35.20 | 35.20 | 35.20 |
| | 100.00 | 100.00 | 100.00 | 100.00 |

[a]EPON 828 - Shell Chemical Company

| | Component B | |
|---|---|---|
| Ingredient | Examples 4-6 | Example 7 |
| ANCAMINE AD[b] | 19.0 | 0.0 |
| VERSAMID 140[c] | 47.0 | 57.0 |
| Triethylene Tetramine | 0.0 | 5.0 |
| Colloidal Silica | 3.5 | 3.0 |
| Aluminum Powder | 0.0 | 17.0 |
| Talc | 30.5 | 18.0 |
| | 100.0 | 100.0 |

[b]A trademarked material of Pacific Anchor Chemical Corp. comprised of approximately 55-60/40-45 blend of phenol/aliphatic amine.
[c]A trademarked material of Henkel USA prepared by condensing a dimerized linoleic acid with a polyamine.

Adhesive Testing

For each of examples 4-6 above, Component A and Component B are metered and mixed together in an A:B weight ratio of 0.87:1. The adhesives so prepared are utilized to bond five sets of 4"×4" SMC parts (DSM-950—Budd Company). The surfaces of the SMC parts are wiped with a dry rag, otherwise none of the surfaces are prepared or treated in any manner before bonding. The adhesive film thickness applied is 30 mils. The bonding assemblies are cured at 93.3° C. for 10 minutes and at 148.9° C. for 30 minutes and tested with the OCF wedge test (SAE Test J 1882), using a 30" wedge with compressive load being applied at a crosshead speed of 0.5" per minute. The results of the tests are shown below in Table 1.

The mode of failure described below is described as either fiber tear (FT) or cohesive failure (COH). A high level of fiber tear is desired since this indicates that the adhesive bond is stronger than the substrate itself. The For Example 7, Component A and Component B are mixed together in an A:B weight ratio of 1.11:1.0. The adhesives so prepared are used to construct lap shear assemblies of various thermoplastics according to ASTM procedure D-1002. The surfaces of the thermoplastic substrates are wiped with a dry rag to remove dust before bonding. An adhesive film thickness of 30 mils is utilized. The assemblies are fixtured, and cured at 93.3° C. for 30 minutes. The assemblies are then tested on a tensile tester at a head speed of 0.5 inches per minute. The results of the tests are shown below in Table 2.

TABLE 2

| | Example 7 | |
|---|---|---|
| Substrate | Energy to Break (lbs.) | Mode of Failure |
| Acrylonitrile-Butadiene/Styrene[a] | 606 | 100 FT |
| Polybutylene Terephthalate-modified Polycarbonate[b] | 852 | 100 FT |
| Polycarbonate[c] | 690 | 100 FT |
| Polyphenylene Oxide[d] | 664 | 100 FT |

[a]CYCOLAC - General Electric Co.
[b]ZENOY - General Electric Co.
[c]LEXAN - General Electric Co.
[d]GTX 910 - General Electric Co.

As can be seen from the above data, the adhesive compositions of the present invention can be utilized with a variety of essentially unprepared substrates to produce an adhesive bond of high strength.

What is claimed is:

1. A two-part adhesive composition comprising a Component A and a Component B wherein Component A comprises an epoxy compound having an epoxy equivalency greater than 1 and an acrylate-terminated polyurethane and Component B comprises an aliphatic polyamine containing at least two primary or secondary amine groups.

2. An adhesive composition according to claim 1 wherein the epoxy compound is selected from the group consisting of the polyglycidyl ethers of polyhydric polyols, the polyglycidyl esters of aliphatic or aromatic polycarboxylic acids, and the polyglycidyl ethers of polyphenols.

3. An adhesive composition according to claim 2 wherein the epoxy compound is the polyglycidyl ether of 2,2-bis(4-hydroxyphenyl) propane.

4. An adhesive composition according to claim 1 wherein the acrylate-terminated polyurethane is the reaction product of (a) a polyisocyanate, (b) an active hydrogen-containing material, and (c) an acrylate compound.

5. An adhesive composition according to claim 4 wherein the polyisocyanate is selected from the group consisting of toluene-2,4-diisocyanate, 4,4'-methylene-bis(cyclohexyl isocyanate), and polymethylene polyphenylene isocyanate.

6. An adhesive composition according to claim 5 wherein the isocyanate compound is toluene-2,4-diisocyanate.

7. An adhesive composition according to claim 4 wherein the active hydrogen-containing material is a polyester polyol selected from the group consisting of 1,6-hexane diol-isophthalate diol, 1,6-hexane diol-adipate diol, 1,6-hexane diol-ethylene glycol-adipate diol, and mixtures thereof.

8. An adhesive composition according to claim 4 wherein the active hydrogen-containing material is a poly(alkylene oxide) polyol selected from the group consisting of poly(propylene oxide) polyols, poly(tetramethylene oxide) polyols, poly(ethylene oxide-propylene oxide) polyols, and poly(ethylene oxide) polyols.

9. An adhesive composition according to claim 8 wherein the poly(alkylene oxide) polyol is poly(propylene oxide) diol or poly(tetramethylene oxide) diol.

10. An adhesive composition according to claim 4 wherein the active hydrogen-containing material is a combination of poly(propylene oxide) diol and 1,6-hexane diol/isophthalate-diol-type polyester polyols in a ratio of former to latter ranging from about 1:3 to 1:4.

11. An adhesive composition according to claim 4 wherein the acrylate compound is selected from the group consisting of 2-hydroxyethyl acrylate, 2-hydroxypropyl acrylate, and a mixture of 2-hydroxyethyl acrylate and a 2-hydroxyethyl acrylate-caprolactone adduct.

12. An adhesive composition according to claim 1 wherein the aliphatic polyamine is a polyalkylene polyamine selected from the group consisting of diethylene triamine, triethylene tetramine, and tetraethylene pentamine.

13. An adhesive composition according to claim 1 wherein Component B comprises a combination of an aliphatic primary polyamine and a polyamide in a ratio of amine functionality to amide functionality ranging from about 1:3 to 1:5.

14. An adhesive composition according to claim 13 wherein the aliphatic polyamine is triethylene tetramine and the polyamide is a polyamide of dimerized linoleic acid.

15. An adhesive composition according to claim 1 wherein the epoxy compound is present in an amount from about 5 to 80 percent by weight and the acrylate-terminated polyurethane is present in an amount from about 5 to 95 percent by weight of the essential components of Component A.

16. An adhesive composition according to claim 15 wherein the epoxy compound is present in an amount from about 20 to 60 percent by weight and the acrylate-terminated polyurethane is present in an amount from about 40 to 80 percent by weight.

17. An adhesive composition according to claim 15 wherein the weight ratio of Component A to Component B is from about 0.5:1 to 10:1.

18. An adhesive composition according to claim 16 wherein the weight ratio of Component A to Component B is from about 0.8:1 to 2:1.

19. An adhesive composition according to claim 1 wherein Component A further comprises a mixture of a polyol and activated silica.

20. An adhesive composition according to claim 19 wherein the polyol is diethylene glycol and the activated silica is fumed silica or colloidal silica.

21. An adhesive composition according to claim 1 wherein Component B further comprises a hydroxy, ring-substituted, aromatic hydrocarbon.

22. An adhesive composition according to claim 21 wherein the hydroxy, ring-substituted, aromatic hydrocarbon is phenol.

* * * * *